Oct. 14, 1969  J. ROTHSTEIN  3,473,145

Q-SWITCHED LASER

Filed June 21, 1966

INVENTOR.
JEROME ROTHSTEIN

BY *Richard Cummings*

ATTORNEY.

United States Patent Office 3,473,145
Patented Oct. 14, 1969

3,473,145
Q-SWITCHED LASER
Jerome Rothstein, Newton Center, Mass., assignor to Laboratory for Electronics, Inc., Boston, Mass., a corporation of Delaware
Filed June 21, 1966, Ser. No. 559,313
Int. Cl. H01s 3/09
U.S. Cl. 331—94.5                        9 Claims

ABSTRACT OF THE DISCLOSURE

A Q-switched laser wherein the laser is constructed so as to function as its own Q switch. The laser material is formed in the shape of a tuning fork having a pair of prongs or tines whose end surfaces are coated with reflective material. The apex of the prongs is V-shaped to reflect wave energy therebetween. Means are provided to vibrate the prongs of the tuning fork such that the end surfaces of the prongs pass through a parallel or optically high Q condition for a short period during each vibrating cycle. Energy is pumped into the laser material while it is in a low Q state and is transmitted therefrom during the very short interval when the Q is high.

---

This invention relates in general to the generation of high power energy pulses by the stimulated emission of radiation and more particularly to a Q-switched laser wherein the laser itself functions as its own Q switch.

Q switching has become a conventional method of producing peak power pulses from a laser system. The Q of a laser system refers to its ability to store energy in the form of a standing or traveling wave. That is to say, a low Q state corresponds to a nonresonant condition of an optical cavity while a high Q state corresponds to a resonant condition of the optical cavity. The basic principle of Q switching, with regard to laser systems is to pump energy into the active laser material while the system is in a low Q state (its ability to store traveling energy is at a very low value). This means that traveling energy is unable to build up in the optical cavity of the laser system. As a result, maximum electron population inversion is attained during this period. When the system is switched to its high Q state (resonant condition) an instantaneous build up of traveling energy results causing in turn a high power radiation burst from the active laser material.

In the past, numerous methods have been used to accomplish Q switching. These include rotating mirrors, prisms, beam choppers, Kerr or Pockels cells and various combinations of the same. Each of the aforementioned methods requires either the use of complex electrical circuitry, rotating mechanical components or special electro-optical shutters to operate properly. Such requirements result in several major disadvantages among which are drift, lack of precision control of pulse timing, bulkiness, unreliability and low accuracy.

Accordingly, a primary object of the present invention is the provision of an apparatus that overcomes the disadvantages prevalent in presently used Q-switching systems.

Another object is the provision of an apparatus characterized by both optical and mechanical resonance.

A further object is the provision of a laser Q switch wherein the active laser material functions as its own Q switch.

Another object is a body of active laser material formed in the shape of a tuning fork to function as an inherent precision timing source for the remainder of the system.

Still a further object is the provision of an apparatus which simultaneously functions as a Q switch and a precision timing source.

Another object is the provision of a laser Q switch whose operation is highly reliable.

Still a further object is an extremely light weight and compact laser Q switch.

In brief, the present invention contemplates the use of a solid state laser material to function as its own Q switch. To this end, in a typical embodiment the active laser material is formed in the shape of a tuning fork having a pair of prongs joined at a common apex. The free end of each prong is coated to form a reflective surface, one surface being partially transmissive to permit emitted light waves to pass therethrough, while the other surface of the material at the apex is V-shaped and acts as a total internal reflector of wave energy. A path within the laser material traced from one reflective surface to the other by way of the apex defines a cavity for traveling wave electromagnetic energy. For example, when the tuning fork is at rest in its natural position, the reflective surfaces can be constructed to be effectively optically parallel to each other and the cavity is optically resonant with respect to the desired emitted light wave. A suitable drive means is coupled to the tuning fork to vibrate the prongs at a predetermined frequency. As the fork prongs vibrate, the reflective surfaces oscillate between parallel and nonparallel positions causing the cavity to vary between resonant and non-resonant conditions. During the portion of the cycle that the cavity is in a nonresonant condition, a flash tube is activated to pump energy into the laser material. Inasmuch as virtually all the pumping action takes place when the cavity is nonresonant, maximum electron population inversion is attained. When the tuning fork passes through its optically resonant configuration the cavity acquires a high Q momentarily, resulting in an instantaneous build up of traveling wave oscillations and hence a burst of wave energy by stimulated emission of radiation from the laser material. Of course, the mechanical vibration cycle can be continuously repetitive with the pump being activated between the times the cavity passes through its resonant condition. It is understood that the choice of the optically resonant configuration as the natural resting position of the tuning fork is by way of illustration as it is generally convenient from the point of view of optical fabrication. The invention is independent of this choice in the sense that it suffices to have an optically resonant condition occur at one of the continuum of configurations successively assumed in time by the vibrating fork.

The above and other objects and features of this invention will become apparent from the following detailed description when read in conjunction with the drawing in which.

Figure 1:
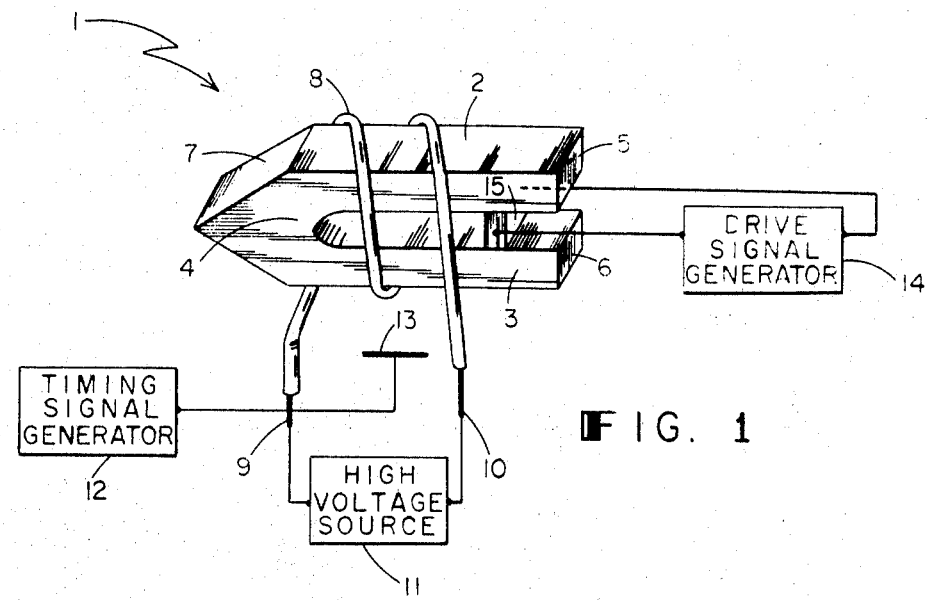
FIG. 1 is a perspective view of a laser shaped in the form of a tuning fork to function as its own Q switch.

With reference now to the drawing and in particular to FIG. 1 thereof, it will be observed that a block of solid state laser material is formed in the shape of an ordinary turning fork 1 having first and second prongs 2 and 3, respectively, extending from a common apex or unbifurcated portion 4. At this point it should be noted that the tuning fork design is used by way of example for descriptive purposes only. Accordingly, it will be understood that the invention contemplates all other mechanically resonant systems compatible with possession of the desired optical resonance properties. The lasing material may be ruby, neodymium in glass, neodymium in calcium tungstate or any other material the nature of which provides the proper energy scheme to enable the generation of a traveling energy wave of the stimulated emission of radiation. The free ends of prongs 2 and 3, are each coated to form optically reflective surfaces 5 and 6, respectively. In order to obtain an output signal from the lasing material, surface 6 is made partially transmissive, ordinarily a few percent, to permit the passage of light waves therethrough. The outer surface of the laser material at apex 4 is V-shaped to provide total internal reflection of the light waves produced by the lasing material. That is to say, a light wave produced by the lasing material oscillates between reflecting surfaces 5 and 6 by way of the V-shaped apex 4. It follows that a path traced within the laser material from reflecting surface 5 to reflecting surface 6 by way of apex 4 defines an optical cavity to store wave energy produced by the laser material. Prongs 2 and 3 of tuning fork 1 are surrounded by a helical xenon filled flash tube 8 having a pair of electrodes 9 and 10, respectively, attached to the ends thereof which are energized by a high voltage supply 11. It will be recognized by those skilled in the art that other flash tube geometries and gas fillings can be used, if appropriate, or other pumping means employed. A trigger electrode 13 cooperates with flash tube 8 and is energized by a signal from a timing generator 12. The output of flash tube 8 is optically coupled to tuning fork 1 by mirror geometry (not shown for purposes of clarity) in a manner well known in the art. A piezoelectric crystal 15 is inserted between prongs 2 and 3, toward the free ends thereof, and cemented to the inner edge of each prong. The output of signal generator 14 is coupled across crystal 15 is mechanically vibrate the same at a predetermined frequency. For purposes of description only, the frequency is assumed to be 5 kc. but, of course, generator 14 may be adapted to provide a drive signal of any desired frequency.

To initiate the operation, signal generator 14 is enabled to provide a signal having a frequency of 5 kc. which is applied across piezoelectric crystal 15. Crystal 15 when energized by the input signal mechanically vibrates at the frequency of the applied signal, in this case 5 kc., in a manner well known in the art. Inasmuch as crystal 15 is cemented to prongs 2 and 3, respectively, the movement of crystal 15 is transmitted to tuning fork 1 to mechanically drive the same.

A moment's thought will make it clear that tuning fork 1 passes through its optically resonant condition (high "Q" state) twice during each cycle of vibration. During the remaining portion of each cycle prongs 2 and 3 of tuning fork 1 are disposed in a position that results in reflective surfaces 5 and 6 being optically non-parallel to each other. It follows that during this time the optical cavity is nonresonant corresponding to a low "Q" state. Inasmuch as the cavity assumes its optically resonant condition for only an extremely short period of time during each cycle, it is apparent that ample time exists for pumping wave energy into the active laser material during each vibration cycle.

To this end, while tuning fork 1 vibrates, trigger electrode 13 is energized by a timing pulse from timing generator 12 only during the portion of the cycle that the optical cavity is in a low "Q" state. That is, as the optical cavity passes through a nonresonant condition, a high voltage discharge is instantaneously applied across a portion of flash tube 8 by way of trigger electrode 13 and electrode 9 or a properly positioned auxiliary electrode in a manner well known in the art. This voltage discharge acts to initiate ionization or break down of the Xenon gas in flash tube 8. Upon breakdown the flash tube resistance suddenly lowers and a high peak current flows through flash tube 8 causing a high power light output which is coupled to tuning fork 1 by suitable mirror geometry (not shown). As a result, radiation energy is pumped into the active laser material which energy is absorbed by the electrons in the lasing material to raise the electrons into a high energy level or excited state. Inasmuch as the pumping action takes place substantially only while the cavity is in its low "Q" state, a maximum electron population inversion is attained. That is to say, light waves emitted by virtue of spontaneous transition of electrons from their excited state to ground level while the laser is in its low "Q" state (nonresonant condition) are substantially dissipated. Such waves are unable to provide substantial inducement or stimulation of the optical emission process. The energy stored in the excited electronic states is thus not drained away before it is needed. It follows that a maximum amount of energy, as measured by the number of electrons in the excited state, is stored in the laser. As the tuning fork continues to travel through its vibration cycle, the optical cavity becomes resonant (high "Q" state) resulting in a favorable climate for the amplification of wave energy emitted by the spontaneous transition of electrons between energy levels. An instantaneous build up of electromagnetic wave energy and a corresponding "dumping" of the stored energy into the electromagnetic wave in the laser follows. That is, the traveling wave energy produced by the spontaneous transition of electrons to a lower energy level stimulates transition of additional electrons to a lower energy level. This cumulative action culminates in a concentrated high power burst of coherent wave energy from the laser. Of course, inasmuch as the tuning fork continuously vibrates, a series of high power pulses can be generated by virtue of pumping the active laser material between the high "Q" states of the optical cavity.

Figure 2:
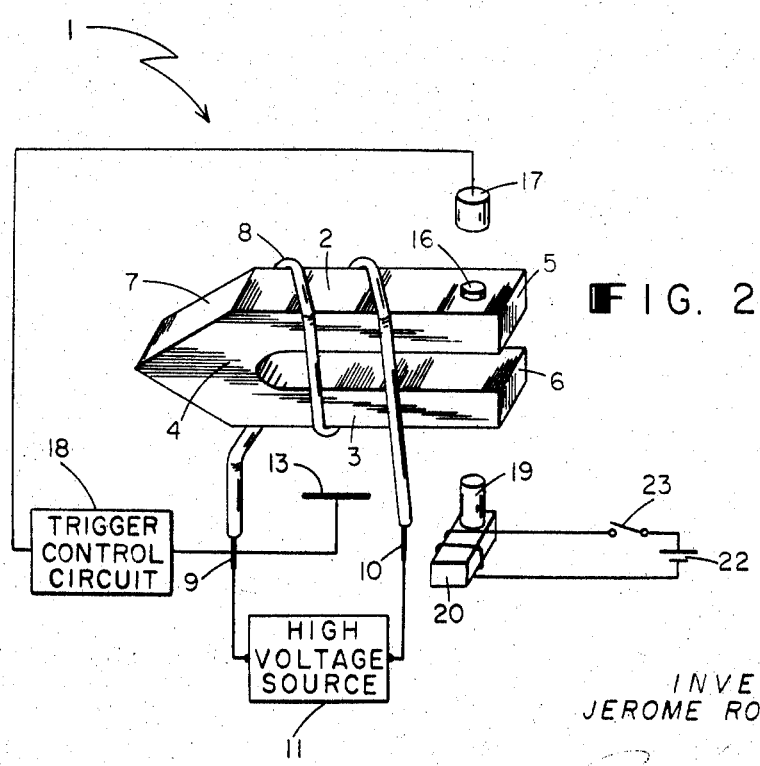
FIG. 2 illustrates an alternative embodiment of the present invention wherein the laser is adapted to act both as its own Q switch and as a precision timing source for the remainder of the system.

The embodiment shown in FIG. 2 is similar to that shown in FIG. 1; and, accordingly, elements in FIG. 2 which correspond to those shown in FIG. 1 are identified by like reference numerals. In this embodiment, however, the independent timing generator has been eliminated and its function replaced by the tuning fork 1 itself. That is, a first transducer element 16 is cemented to the outer surface of prong 2 adjacent to the edge of the relective surface 3. A second transducer element 17 is located at a fixed distance directly above the first element 16 and adapted to cooperate therewith. An output signal from transducer element 17 is coupled to trigger control circuit 18 whose output in turn is applied to trigger electrode 13. Control circuit 18 may comprise any suitable electronic switch which operates upon actuation to apply a high voltage between trigger electrode 13 and electrode 9 or a properly positioned auxiliary electrode. It should be evident to those skilled in the art that transducer elements 16 and 17 may be any one of several well known types. For purposes of description and by way of example only, the transducer formed by elements 16 and 17 will be considered to be an electromagnet.

A solenoid plunger 19 is situated directly below the outer surface of prong 3 and adapted, when activated, to mechanically contact prong 3. The operative condition of solenoid plunger 19 is controlled by relay 20 whose condition in turn is controlled by mechanical switch 23 connected in series with a battery 22. Of course, it is apparent that switch 23 may be some type of electrical switch, such as a transistor, if desired.

In operation, switch 23 is closed momentarily, to energize electrical relay 20. Upon energization, relay 20 releases solenoid plunger 19 which travels upwardly to strike the outer surface of prong 3. This action initiates the mechanical vibration of tuning fork 1 and after actuation the tuning fork continues to vibrate at its natural frequency. This frequency, obviously, depends upon the inherent properites and design of the tuning fork 1. In the course of vibration, transducer element 16 approaches very close to transducer element 17. This, in turn, alters the magnetic field associated with element 17 to produce an output signal which is coupled to the input of trigger control circuit 18. Trigger control circuit 18 responds to the input signal to provide a high voltage discharge by way of trigger electrode 13 to initiate operation of flash tube 8 and pump wave energy into the active laser material in the same manner as previously discussed with regard to FIG. 1. As was the case in the embodiment illustrated in FIG. 1, when the cavity passes through its resonant condition a sudden build up of wave energy results accompanied by a coherent burst of radiation from the laser tuning fork. From the foregoing description it is apparent that the illustrated embodiment provides a laser that functions not only as its own "Q" switch, but also as an inherent precision timing source. Of course, inasmuch as the natural vibration frequency of the tuning fork is utilized, this arrangement is also suitable when a "one-shot" operation is desired.

From the foregoing description it will be apparent to those skilled in the art that numerous variations and departures may be made from the specific disclosed embodiments without departing from the inventive concepts. For example, other drive means such as a magnetostrictive device or electromechanical driver may be used in place of the piezoelectric crystal. Consequently, the invention is to be construed as limited only by the spirit and scope of the appended claims.

What is claimed is:

1. Apparatus for generating an electromagnetic wave energy pulse by stimulated emission of radiation comprising: solid state material characterized by the capability to generate electromagnetic wave energy and having a pair of optically opposed surfaces, said opposed surfaces of the material forming a resonant cavity for electromagnetic wave energy; means to vibrate said solid state material to thereby vary the resonant condition of the cavity; and, means to pump energy into said material, said latter means being operative substantially only when said cavity is in a nonresonant condition.

2. Apparatus as claimed in claim 1 wherein the solid state material is formed in the shape of a tuning fork having a pair of prongs extending from an unbifurcated portion, the outside surface of said unbifurcated portion being shaped to act as a total internal reflector of traveling wave energy.

3. Apparatus as claimed in claim 2 wherein a reflective surface is formed on the free end of each prong of said tuning fork and said resonant cavity is defined by the distance between the reflective surfaces measured by way of said unbifurcated portion.

4. Apparatus as claimed in claim 2 wherein the vibrating means comprises a body of material having the property of varying its dimensions in response to an applied voltage, said body being attached between the prongs of said tuning fork, and means to drive said body at a predetermined frequency.

5. Apparatus as claimed in claim 4 wherein said body of material is a piezoelectric crystal.

6. Apparatus as claimed in claim 4 wherein the pumping means comprises a flash tube optically coupled to said tuning fork.

7. Apparatus as defined in claim 2 comprising in addition: a transducer having at least a pair of elements; a first element in mechanical interaction with one of said prongs, a second element arranged to cooperate with said first element, said transducer being adapted to produce a signal only when said cavity is in a nonresonant condition; and, means to connect said signal to said pumping means to initiate the pumping of energy into said material.

8. Apparatus as defined in claim 7 wherein said vibrating means comprises a solenoid plunger being adapted, when energized, to impart mechanical energy to one of said prongs.

9. Apparatus to produce high power energy pulses by stimulated emission of radiation comprising: a body of solid state material characterized by a capability to produce electromagnetic wave energy, said body being at least a part of a resonant cavity to amplify wave energy; means associated with said body to vary the resonant condition of the cavity, said latter means being adapted to act as a precision timing source; and, means responsive to said latter means to pump wave energy into said body substantially only when the cavity is in a nonresonant condition.

No reference cited.

JOHN KOMINSKI, Primary Examiner

U.S. Cl. X.R.

331—156